United States Patent [19]

Mole et al.

[11] 4,058,746
[45] Nov. 15, 1977

[54] DYNAMOELECTRIC MACHINERY UTILIZING SUPERCONDUCTIVE WINDINGS

[75] Inventors: Cecil J. Mole, Monroeville; Robert F. Edwards, Murrysville, both of Pa.

[73] Assignee: Westinghouse Electric Corporation, Pittsburgh, Pa.

[21] Appl. No.: 596,775

[22] Filed: July 17, 1975

Related U.S. Application Data

[63] Continuation of Ser. No. 327,540, Jan. 29, 1973, now Defensive Publication No. T917,006.

[51] Int. Cl.² .............................................. H02K 9/00
[52] U.S. Cl. ...................................... 310/10; 310/52; 310/269
[58] Field of Search .................... 310/10, 40, 52, 194, 310/165, 198, 54, 201, 205, 266, 269

[56] References Cited

U.S. PATENT DOCUMENTS

| 3,242,418 | 3/1966 | Mela | 310/52 |
|---|---|---|---|
| 3,368,087 | 2/1968 | Madsen | 310/10 |
| 3,471,726 | 10/1969 | Burnier | 310/10 |
| 3,644,766 | 2/1972 | Hughes | 310/40 |
| 3,648,082 | 3/1972 | MacNab | 310/10 |
| 3,679,920 | 7/1972 | MacNab | 310/10 |
| 3,679,920 | 7/1972 | MacNab | 310/52 |
| 3,772,543 | 11/1973 | Woodson | 310/52 |

*Primary Examiner*—R. Skudy
*Attorney, Agent, or Firm*—G. H. Telfer

[57] ABSTRACT

Iron or other ferromagnetic material is utilized in the magnetic circuit of dynamoelectric machines having superconductive field or excitation windings. In DC machines, a stationary salient pole field structure with a superconductive main field winding is utilized. An armature winding is wound about a smooth rotor. In AC machines, a ferromagnetic structure that encloses and rotates with a superconductive excitation winding is utilized. The ferromagnetic structure may include either salient poles interconnected by ferromagnetic shunts or a slotted or toothed rotor.

38 Claims, 7 Drawing Figures

DYNAMOELECTRIC MACHINERY UTILIZING SUPERCONDUCTIVE WINDINGS

This is a continuation of application Ser. No. 327,540, filed Jan. 29, 1973, now a Defensive Publication T917006.

BACKGROUND OF THE INVENTION

1. Field of the Invention:

This invention relates primarily to dynamoelectric machinery having a superconductive winding, and, more specifically, this invention relates to dynamoelectric machinery utilizing superconductive field or excitation windings with a ferromagnetic field structure.

2. Description of the Prior Art:

Interest in the use of cryogenic technology in dynamoelectric machinery has recently become quite intense. Since 1911 it has been recognized that when certain materials are cooled to near absolute zero they exhibit a complete loss of electrical resistance. Although attempts have been made from time to time to make practical application of this theoretical knowledge, the phenomenon of superconductivity has remained essentially a scientific curiosity.

It is only within the last decade or so that the practical utilization of the resistanceless character of superconductive materials at cryogenic temperatures has been studied with any real intensity as a viable possibility for use in the electrical machinery field. Several of the more technologically advanced nations of the world are now seriously investigating the possibility of utilizing the phenomenon of superconductivity in electrical motors and generators.

There are a number of reasons for the relatively recent growth of interest in superconductivity. Among these reasons is the necessity generated by technological advances that greater and greater power requirements be met by single units. Conventional design techniques seem to be asymptotically approaching a point where small additional power outputs can be reached only by excessive size increases, with the accompanying manufacturing and cooling problems. At the same time, the additional space requirements resulting from such increased power capabilities, when conventional designs can provide such capabilities, are becoming less and less acceptable. In fact, there is even considerable pressure for the reduction of the size of machines having power outputs that can be realized by conventional designs, both as a practical matter resulting from the sharply inflationary costs of materials and as a public service resulting from the sociological emphasis on ecological considerations involved in the procuring and processing of such materials. In response to these pressures and the development of intrinsically stable superconductors, much consideration is being given to the possibility of utilizing superconductive machinery to meet some of the power requirements of the future.

The great benefit of superconductive windings in dynamoelectric machinery is that, as a result of the large current that can be handled with virtually no resistance heating and subsequent power loss, extremely high flux densities can be produced in the machines. As a result of these very high flux densities, the loss or inefficient use of some magnetic flux is not as important as in conventional machines, where a limited supply of magnetic flux is involved. Accordingly, efforts directed to the use of the superconductive effect in rotating machinery have been concentrated on the removal of iron to decrease the size and weight of the machine. As a result, prior art work in this field has been devoted to production of machines utilizing essentially all air gap arrangements.

Although superconductive windings produce extremely high strength magnetic fields, use of an all air gap construction still presents considerable difficulties with respect to the obtaining of sufficient magnetic flux at the positions required for efficient motor or generator operation for all the modes of operation. The use of iron or other ferromagnetic material to aid in the distribution and control of the dynamoelectric machine magnetic fluxes has not been considered a viable approach, due to the fact that the ferromagnetic material would be saturated at the high field strengths resulting from the large currents in the superconductor.

With respect to direct current (DC) machines, the use of all air gap construction has resulted in less efficient operation than desired and has been accompanied by significant commutation problems. Therefore, even though the weight and size of DC machines may be considerably reduced by the use of superconductive windings in an all air gap construction, the ratio of efficiency to weight and volume has not evidenced as dramatic an increase as would appear to be theoretically possible by the use of superconductive windings.

With respect to alternating current (AC) machines, an all air gap arrangement utilized in connection with a superconductive excitation winding will perform satisfactorily at synchronous speeds. However, the relatively low frequency AC fields present during asynchronous operation, when the machine is starting or transient conditions are encountered, will penetrate into the superconductive winding and cause excessive eddy current and hysteresis losses. Thus, prior art devices have had to include a separate flux shield, such as that disclosed in U.S. Pat. No. 3,679,920 — MacNab et al, issued July 25, 1972.

SUMMARY OF THE INVENTION

A much more efficient machine, in which many of the problems encountered in prior art devices are minimized, may be produced by utilizing iron or other ferromagnetic material in the magnetic circuit of the machine. Use of a superconductor as the field winding with an appropriate field structure of iron or other ferromagnetic material results in the production of a machine with much higher output power than conventional machines of the same size. Such a machine also has a much greater efficiency than superconductive machines utilizing an all air gap structure.

In the DC embodiments, a superconductive field winding is utilized to provide a stator field. It should be noted that although the singular term "superconductive winding" is utilized throughout, the winding may consist of a plurality of segments or the field system may include a multiplicity of superconductive windings. In a preferred form of the invention, a smooth rotor having an armature winding thereon is utilized with the superconductive field winding.

A first DC embodiment has an insulating means, such as a dewar vessel in the form of a cylindrical annulus, to thermally isolate a core of ferromagnetic material and a superconductive winding located therein. (Although all of the embodiments described herein will be in terms of a cylindrical structure, it should be realized that the principles of this invention are equally applicable to machines having other structural shapes.) The cylindrical annulus shape of the dewar vessel is formed by inner and outer concentric cylindrical annulus vacuum chambers that provide insulating barriers. Each of the cylindrical annulus vacuum chambers contains a radiation shield to aid in preventing heat flow to the internal portion of the dewar vessel. A plurality of cryogenic magnetic poles are formed within the dewar vessel by placing the superconductive winding about a core of ferromagnetic material. A salient pole field structure is located between the dewar vessel and the rotor. The salient pole field structure includes a plurality of main field poles having head and neck portions. Auxiliary field windings may be wound about the neck portions. Compensating windings may be placed in the head portion of the main field poles. Interpoles having head and neck portions with commutating windings wound on the neck portions may be positioned between the main field poles. In addition, ferromagnetic shunts may be positioned between the main field poles, and eddy current damper shields may be located in the dewar vessel structure.

In another DC embodiment, the stator has a salient pole field structure in which the main field poles are integrally formed with and protrude from a cylindrical annulus of ferromagnetic material. The superconductive field winding has a separate segment thereof wound around each of the main field poles. Each segment of the superconductive winding is encased within an insulating means, such as a dewar vessel of the type described in connection with the first DC embodiment. An auxiliary field winding may be located about each of the main field poles. Compensating windings, interpoles, commutating windings, iron shunts, and eddy current damper shields, may be utilized as in the first DC embodiment.

Both of the DC embodiments utilize an armature winding wound on a smooth rotor that has no slots formed therein nor teeth located thereon. The smooth rotor may be of the type previously known as a Gramme ring winding. The Gramme ring structure has not been used commercially for an extended period of years, due to the inherent inefficiency of such a structure in a conventional machine. The use of a superconductive winding with the structures disclosed herein has resulted in a machine that is considerably more efficient than prior art machines utilizing superconductive windings and has output ratings that considerably exceed those that can be obtained with a conventional machine of a similar size. By use of the salient pole field structure and smooth rotor described herein, commutation of a machine utilizing a superconductive field winding has been improved to an extent that was considered impossible by those working in the field.

In the AC embodiments of this invention, a superconductive field winding is located on the rotor of the machine. The superconductive field winding is wound about a magnetic core to form a plurality of cryogenic magnetic poles. A vacuum chamber in the form of a generally cylindrical annulus provides a dewar vessel in which the superconducting winding and cryogenic magnetic poles are located. The dewar vessel serves as an insulating means for thermally isolating the superconductive winding and cryogenic magnetic poles. An essentially conventional stator having an armature winding thereon is utilized.

In one of the AC embodiments the cylindrical dewar vessel is enclosed by and attached to a cylindrical rim of ferromagnetic material that separates the rotor from the stator. A plurality of main field poles having head and neck portions are integrally formed with and extend from the cylindrical rim toward the stator. An induction or damper starting winding is located in the head portions of the main field poles which may be interconnected between poles. Auxiliary field windings may be placed on the neck portions of the main field poles. Eddy current damper shields may be included in the dewar vessel structure.

Another AC embodiment has a cylindrical annulus of ferromagnetic material surrounding the dewar vessel and arranged to rotate therewith. In the outer portion of the annulus of ferromagnetic material there is wound an auxiliary winding in the form of a damper starting or induction winding.

Starting (asynchronous) torque for both AC embodiments (when used as motors) is produced by the interaction between the field accompanying the current induced in the starting winding and the field accompanying the current applied to the armature winding on the stator. During synchronous operation torque is produced by interaction of the superconductive field and the armature flux. Thus, a machine is produced which acts as an asynchronous or induction motor for starting purposes and which then operates in the synchronous mode during steady state conditions. The ferromagnetic material encircling the superconductive winding serves as a magnetic flux shunt path to protect this winding from eddy current and hysteresis losses that would be occasioned by low frequency AC fields during the asynchronous operation of the machine. (In prior art machines utilizing superconductive windings, these losses could result in "quenching" or loss of the superconductivity.) For synchronous operation the superconductive winding is energized and the ferromagnetic material providing the shunt path becomes saturated, so that a relatively small percentage of flux is shunted during the synchronous mode. As the main flux path is through the dewar vessel wall, the reluctance of this path is considerably higher during asynchronous operation and virtually all of the AC flux follows the shunt path. However, when the shunt path is saturated the flux follows the main flux path to provide synchronous operation.

By utilizing iron or another ferromagnetic material in the magnetic circuit of dynamoelectric machines, a greatly improved result may be achieved. With such a structure there is some loss in the size and weight advantages that can be obtained by use of an all air gap structure. However, the use of ferromagnetic material in the flux path produces unexpected improvements in the operating of the machine at the high flux levels produced by the superconductive windings. In both DC and AC machines the active flux linkages are greatly improved. In addition, the problems relating to commutation in DC machines and low frequency losses in AC machines, which have greatly hampered pervious attempts to utilize superconductive windings, are greatly reduced. Accordingly, the use of iron in the magnetic circuit of dynamoelectric machines having superconductive windings has resulted in the production of such machines that have a much greater power capacity than conventional machines of the same size and a much greater efficiency than prior art machines utilizing superconductive windings with all air gap construction.

The foregoing and other objects, advantages and features of this invention will hereinafter appear, and for purposes of illustration, but not of limitation, exemplary embodiments of the subject invention are shown in the appended drawing.

DESCRIPTION OF THE PREFERRED EMBODIMENTS

Figure 1:
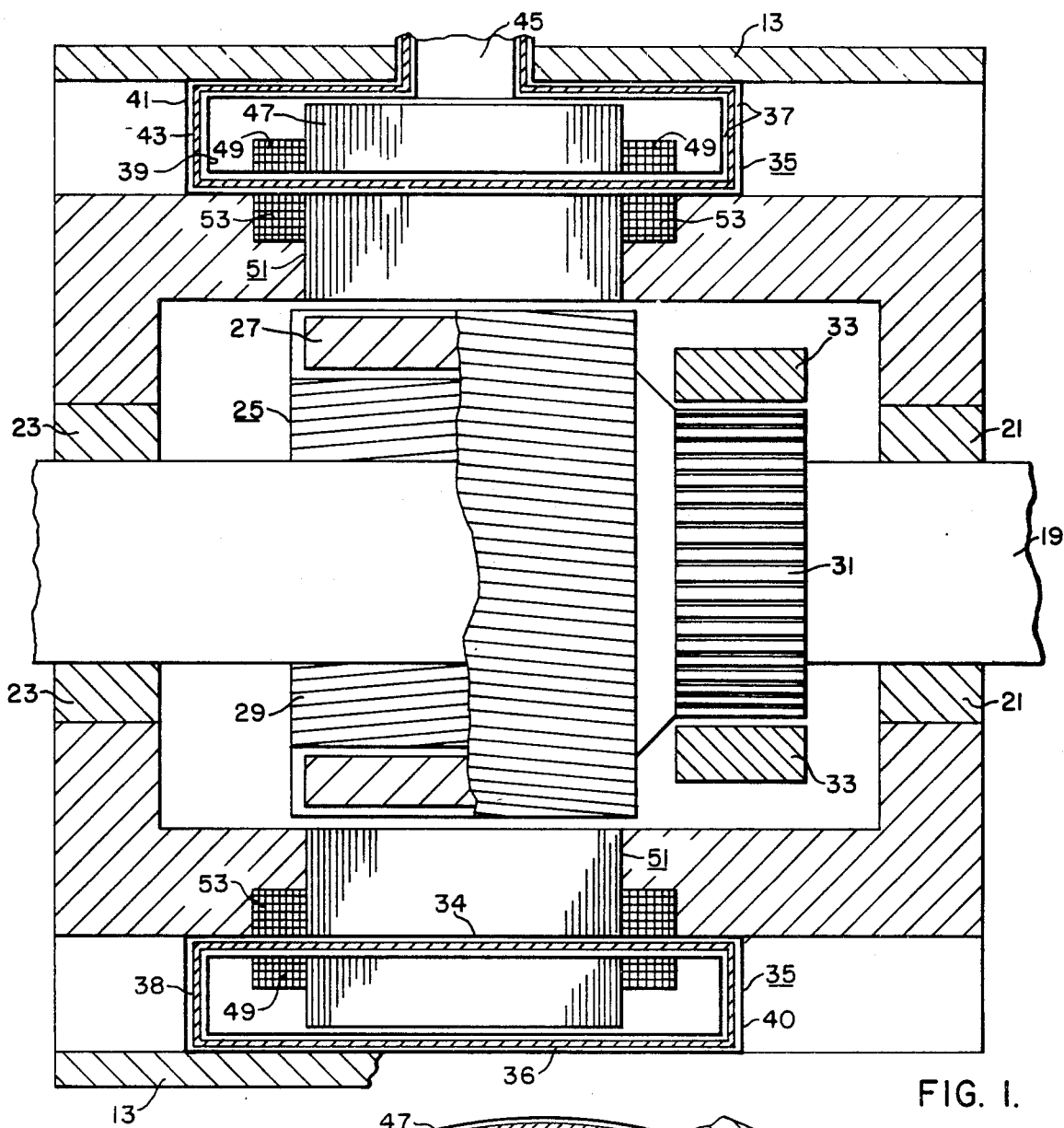
FIG. 1 is a schematic, axial, cross-sectional view of a first DC embodiment of the present invention.

In FIG. 1 there is schematically illustrated, by means of an axial cross-sectional view, a dynamoelectric machine 11. Dynamoelectric machine 11 is enclosed in a housing 13. Housing 13 is generally cylindrical in shape with end plates 15 and 17. Further description of this embodiment and the other embodiments disclosed herein will be directed toward machines having a generally cylindrical shape, but it should be recognized that the principles of this invention are applicable to dynamoelectric machines having other shapes.

A shaft 19 is mounted in housing 13 by bearings 21 and 23. Bearings 21 and 23 are conventional and are positioned at each end of housing 13 to support shaft 19 for rotational movement. Shaft 19 serves to either extract power from the machine, if the machine is used as a motor, or to drive the rotor, if the machine is utilized as a generator.

Figure 2:
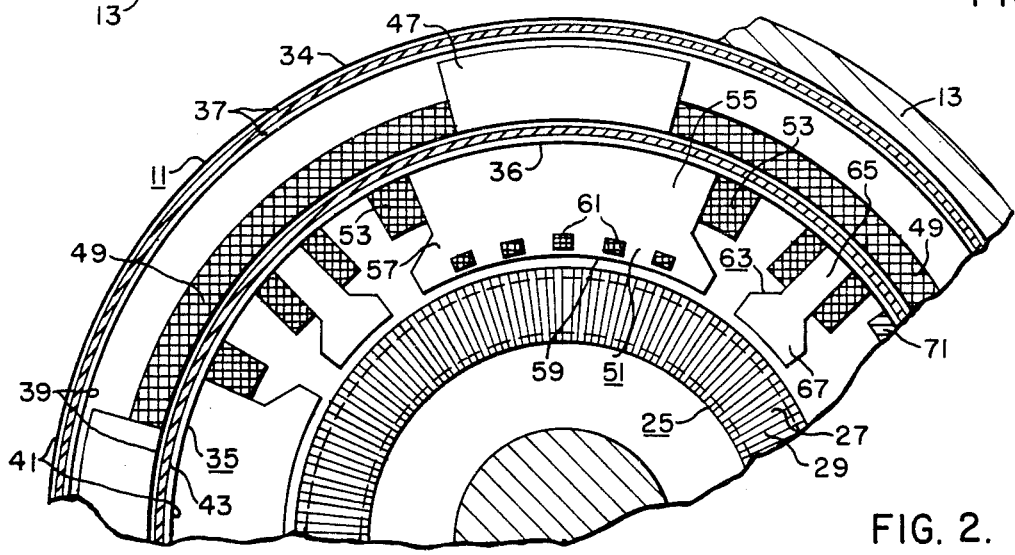
FIG. 2 is a schematic cross-sectional view taken along a plane transverse to the axis of the embodiment illustrated in FIG. 1, with only one of the identical quadrants depicted in detail.

A smooth rotor 25, having neither slots nor teeth, is mounted on shaft 19 for rotation therewith. Rotor 25 may be integrally associated with shaft 19, or it may be securely connected thereto by a non-magnetic structure, such as a spider arrangement. In this particular embodiment, smooth rotor 25 is shown as a Gramme ring armature structure (as best seen in FIG. 2). The Gramme ring structure includes a smooth magnetic core 27 around which an armature winding 29 is wound. Core 27 is normally made of an appropriate ferromagnetic material, such as iron, although in some environments a non-magnetic core may be preferred. Winding 29 and core 27 operate at ambient temperatures.

Although the smooth rotor 25 is depicted as a Gramme ring armature structure in this preferred embodiment, it should be recognized that the rotor can be of any appropriate shape. It has been discovered, however, that the use of a smooth rotor with the stator arrangement disclosed herein is particularly useful in reducing leakage flux losses. By utilizing the high magnetic field densities produced by superconductive windings with a salient pole field structure, the inherent relatively small percentage of flux cut by the active conductors is increased, as is the total amount of flux encountered by the active conductors. The disadvantage of a smaller percentage of flux linkages resulting from a smooth rotor is more than offset, in this particular structure, by the reduction in leakage flux.

The leakage flux in a DC machine of this type is particularly troublesome in its effect upon commutation, which is achieved by means of a commutator 31. Commutator 31 is connected to armature winding 29 to remove the electrical energy induced in the armature winding when the machine is utilized as a generator and to supply electrical energy thereto when the machine is utilized as a motor. When the machine operates as a generator, commutator 31 rectifies the induced voltages to produce a DC output. When the machine is utilized as a motor, commutator 31 supplies direct current to the appropriate portions of the armature winding. The electrical energy is supplied to or obtained from external circuitry by means of an appropriate brush gear 33.

A stationary dewar vessel 35 is positioned near the housing 13 at a greater radius with respect to shaft 19 than smooth rotor 25. Stationary dewar vessel 35 is in the shape of a cylindrical annulus with a vacuum chamber 37 separating the interior of the dewar vessel 35 from ambient conditions. In cross-section (FIG. 1), dewar vessel 35 is seen as an outer insulating barrier 34 and an inner insulating barrier 36 interconnected by insulating barriers 38 and 40. Vacuum chamber 37 is formed by an inner wall 39 and an outer wall 41. Between walls 39 and 41, in vacuum chamber 37, there is located a radiation shield 43 which aids in preventing thermal conduction from the exterior of dewar vessel 35 to the interior thereof. As a result of the insulation that is created by vacuum chamber 37 and radiation shield 43, the interior of dewar vessel 35 is thermally isolated from ambient conditions. (As a practical matter there will be some heat loss, but it will be very small. The term "thermally isolated" as used herein shall refer to the practical situation as opposed to a theoretically perfect isolation.)

The interior of dewar vessel 35 is maintained at a temperature near to absolute zero by an appropriate cryogenic fluid, such as nitrogen or helium. Due to the lower boiling temperature of helium (approximately 4° Kelvin), it is generally preferred for the cryogenic fluid, although other cryogenic fluids may have equal or even greater utility in certain situations. The cryogenic fluid is introduced to the interior of dewar vessel 35 through a conduit 45 which extends through housing 13. Conduit 45 is appropriately insulated to minimize heat transfer through the wall.

A magnetic core 47 is located in the dewar vessel 35. Magnetic core 47 is made of a material that exhibits ferromagnetic characteristics at cryogenic temperatures, such as dysprosium or nickel-iron, although the core 47 may be made of a non-magnetic material for some uses. A superconductive winding 49, made of a suitable superconductive material such as niobium-titanium, is wound about core 47 to form a plurality of cryogenic magnetic poles. Separate magnetic cores 47 may be utilized for each desired cryogenic magnetic pole, or an appropriately formed single core may be utilized to provide the desired cryogenic magnetic poles. Similarly, superconductive winding 49 may be either a single winding with individual segments thereof wound about the cryogenic magnetic pole areas of core 47, or it may consist of completely separate superconductive segments, both of which possibilities are encompassed by the term "superconductive winding".

A salient pole field structure is positioned between dewar vessel 35 and smooth rotor 25, i.e., in the magnetic circuit of the machine. The salient pole field structure includes a main field pole 51. An auxiliary field winding 53 may be wound about main field pole 51. Auxiliary winding 53 may be either at ambient temperature (as shown here) or could be a superconductive winding with appropriate insulation and a proper refrigerant. In the event that, for any reason, the superconductive field should fail, the auxiliary winding 53 could provide a relatively low strength field that could suffice for emergency operation.

Some details of the construction of this preferred embodiment may be better comprehended by reference to FIG. 2. From this Figure it may be seen that main field pole 51 has a neck portion 55 and a head portion 57. In this relatively conventional pole structure, a pole face 59 on head portion 57 is formed to cover a greater circumferential arc than the neck portion 55. Compensating windings 61 may be located in head portion 57 of main field pole 51.

It may also be noted that cryogenic magnetic pole 47 is centered on main field pole 51 and positioned adjacent thereto. Normally, the number of cryogenic magnetic poles 47 will equal the number of main field poles 51, although this need not necessarily be so.

Interpoles 63 may be located between each pair of main field poles 51. Interpoles 63 have the same structure as main field poles, i.e., a neck portion 65 and a head portion 67. A commutation winding 69 is wound about the neck portion of each of the interpoles 63.

Other protective measures could include eddy current damper shields made of electrically conductive material located in walls 39, 41 or 43 of the dewar vessel or placed about the superconductive winding 49. In some instances, walls 39 and 41 could be constructed of an electrically conductive material, such as aluminum. In other cases, a sheet of a conductive material such as copper could be located on these walls or on the radiation shield 43. The eddy current damper shield aids in preventing AC fields from penetrating into the superconductive field winding.

Another step that may be taken is to utilize interpolar magnetic shunts, as schematically depicted at 71. Interpolar shunts 71 are made of ferromagnetic material and assist in obtaining the desired distribution of flux.

The structure of each of the other quadrants of the machine would be identical to that of the one quadrant illustrated in FIG. 2. With this arrangement, a machine is produced that utilizes a superconductive winding in such a fashion as to improve upon the operation of both conventional machines and other prior art machines utilizing superconductive windings.

Figure 3:
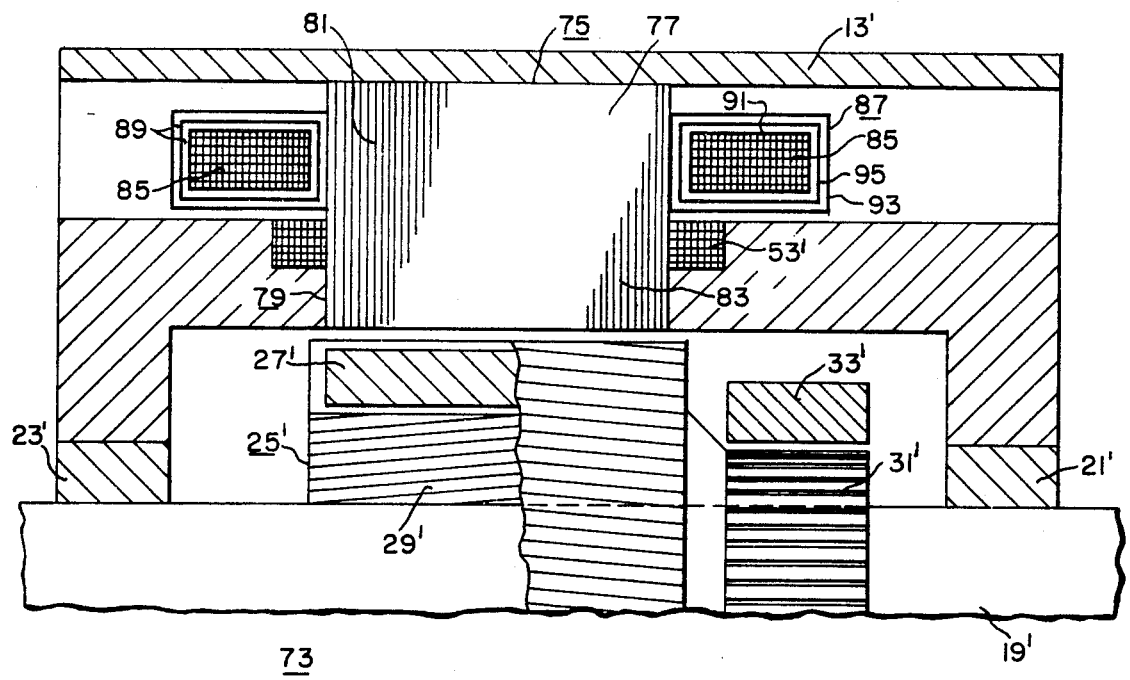
FIG. 3 is a schematic, axial, cross-sectional view of a second DC embodiment of the present invention, with only the half of the structure above the axis being shown.
Figure 4:
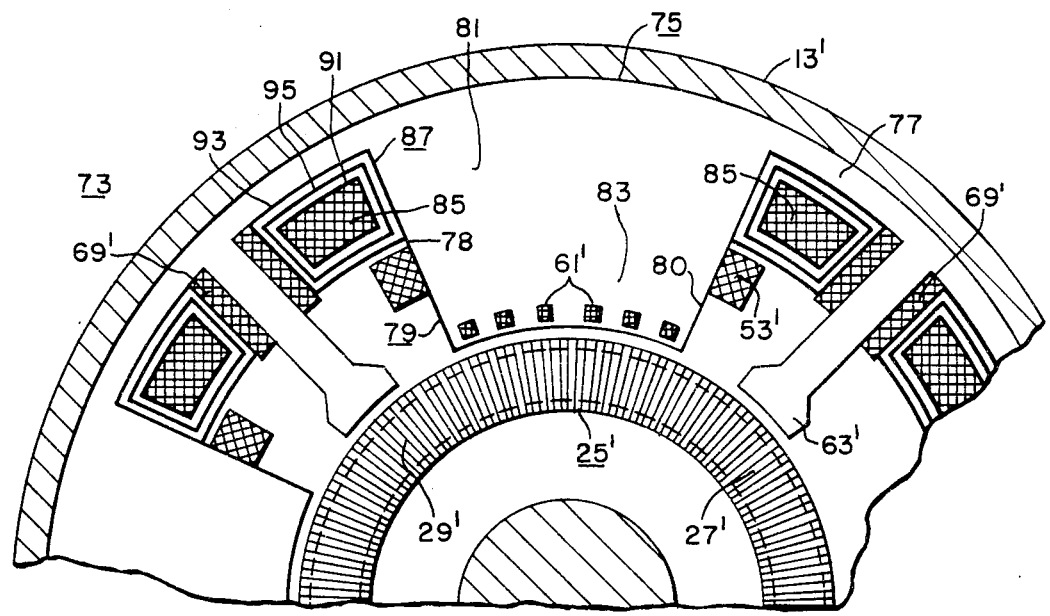
FIG. 4 is a schematic cross-sectional view taken along a plane transverse to the axis of the embodiment illustrated in FIG. 3, with only one of the identical quadrants depicted in detail.

With reference now to FIGS. 3 and 4, a second embodiment of the present invention is illustrated as a direct current dynamoelectric machine 73. The housing and rotor portions of this embodiment are identical to the embodiment illustrated in FIGS. 1 and 2, and corresponding parts have been identified by primed numerals corresponding to the numerals utilized in connection with the usage in FIGS. 1 and 2.

A salient pole field structure 75 utilized in the FIGS. 3 and 4 embodiment differs from the salient pole field structure utilized in connection with the embodiment illustrated in FIGS. 1 and 2. Salient pole field structure 75 incorporates a cylindrical annulus 77 of ferromagnetic material from which extends main field poles 79 integrally formed therewith. Main field poles 79 have an arcuate trapezoidal shape with parallel, equal length sides 78 and 80 that lie on radial lines emanating from the central axis of machine 73. A segment of superconductive winding 85 is wound around a portion 81 of main field pole 79 that abuts the annulus 77. An auxiliary winding 53' may be wound around a portion 83 of field pole 79 that is closer to rotor 25' and farther from annulus 77 than is portion 81.

A dewar vessel 87 surrounds the superconductive winding 85 in order to maintain the superconductive winding at cryogenic temperature. Dewar vessel 87 is essentially the same as the dewar vessel 35 illustrated in FIGS. 1 and 2, with a vacuum chamber 89, an inner wall 91, an outer wall 93, and a radiation shield 95.

As in the embodiment of FIGS. 1 and 2, compensating windings 61' may be positioned in portion 83 of each main field pole 79. Similarly, interpoles 63' with commutating windings 69' wound thereon may be located between adjacent pairs of main poles 79. In addition, interpolar shunts and eddy current damper shields, such as those discussed in connection with the embodiment of FIGS. 1 and 2 may be utilized in connection with this embodiment.

Figure 5:
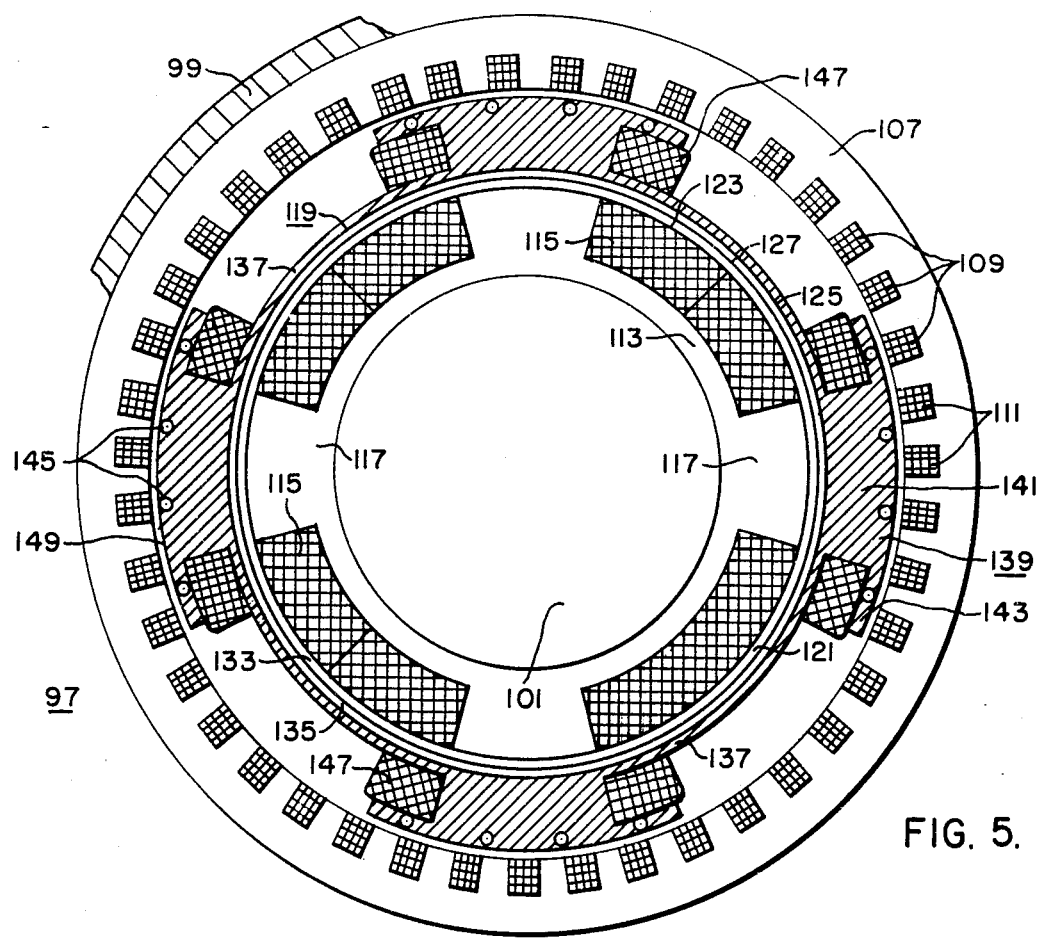
FIG. 5 is a schematic cross-sectional view taken along a plane transverse to the axis of a first AC embodiment of the present invention.
Figure 6:
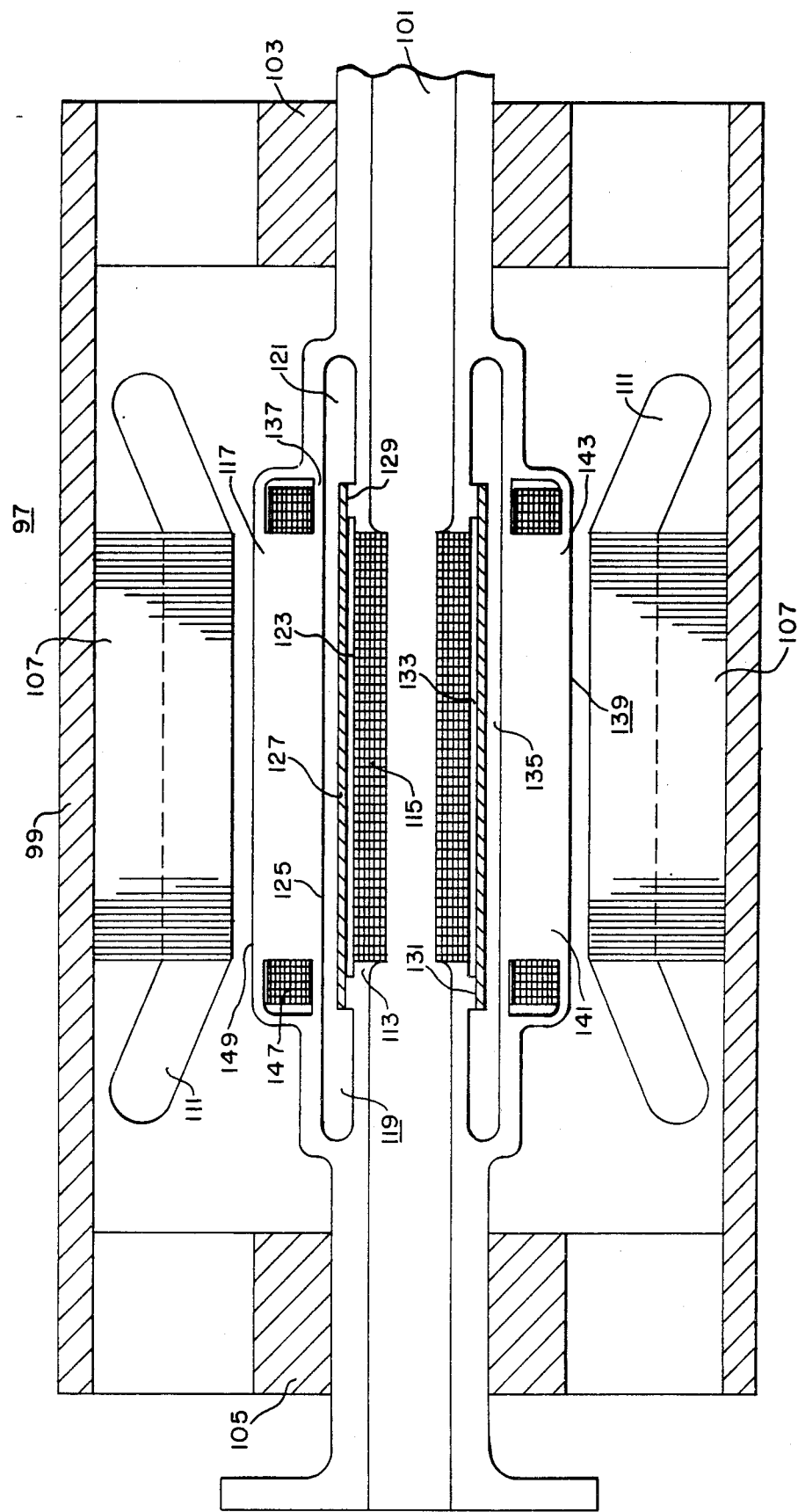
FIG. 6 is a schematic, axial, cross-sectional view of a preferred structure of the embodiment illustrated in FIG. 5.

Attention may now be directed toward FIGS. 5 and 6 which illustrate a dynamoelectric machine 97 evidencing yet another embodiment of the present invention, in this case an alternating current machine. Dynamoelectric machine 97 has a housing 99 which encloses stator and rotor portions thereof. A shaft 101 is mounted on bearings 103 and 105 to couple power in or out of machine 97.

The stator of dynamoelectric machine 97 is a fairly conventional one having a cylindrical annulus of ferromagnetic material 107 in which are formed slots 109. An relatively conventional stator winding 111 is positioned in slots 109.

Located internally of the stator core 107 is the rotor of the machine 97. A magnetic core 113 is mounted on shaft 101 for rotation therewith. Magnetic core 113 is formed of a material that exhibits ferromagnetic properties at cryogenic temperatures, such as dysprosium or nickel-iron. As in the case of the DC embodiments depicted in FIGS. 1-4, this core need not be of ferromagnetic material, but may be of non-magnetic material. However, the preferred approach is to utilize a ferromagnetic material.

A superconductive field winding 115 is wound on core 113 to form cryogenic magnetic poles 117. As in the case of the DC embodiments, the superconductive winding 115 may be a single winding or may be a plurality of independent segments.

An insulating structure, shown in FIGS. 5 and 6 as a cylindrical dewar vessel 119, surrounds the core 113 and the superconductive winding 115 wound thereon and provides a thermally non-conductive casing. Dewar vessel 119 has a vacuum chamber 121 formed by an inner wall 123 and an outer wall 125. A radiation shield 127 is located between walls 123 and 125. As shown in the particular embodiment of FIG. 6, dewar vessel 119 is formed from ferromagnetic material 113 integrally mounted on shaft 101. Radiation shield 127 is placed on flanges 129 and 131 which extend upward from core 113 a distance beyond the outer surface of superconductive winding 115. A positioning of radiation shield 127 on flanges 129 and 131 forms a first portion 133 of vacuum chamber 121 adjacent superconductive winding 115. A second portion 135 of vacuum chamber 121 is formed between radiation shield 127 and another part 137 of core material 113 displaced therefrom.

Part 137 of core 113 is a cylindrical rim of ferromagnetic material that completely surrounds the dewar vessel 119. A plurality of main field poles 139 extend from and are integrally formed with rim 137. Rim 137 interconnects main field poles 139 to provide a magnetic shunt therebetween. This magnetic shunt serves to prevent low frequency AC fields from penetrating into the superconductive winding during starting or asynchronous operation of the machine when it is utilized as a motor. Rim 137 and main field poles 139 form a salient pole field structure.

Each of the main field poles 139 has a neck portion 141 and a head portion 143. As in the case of the DC embodiment of FIGS. 1 and 2, head portion 143 has a pole face 149 that covers a greater circumferential arc than neck portion 141. Amortisseur or damper starting windings 145 are located in head portion 143 of the main field poles 139. An auxiliary winding 147 may be wound about neck portion 141 of each of the main field poles 139. If the superconductive field should fail for any reason, the field produced by auxiliary winding 147 would permit emergency operation of machine 97.

In operating machine 97 as a motor, stator 111 would be energized with an AC current. The AC field produced by the stator winding will induce a current in damper windings 145 to produce asynchronous torque, as in a conventional induction motor or self-starting synchronous motor. Magnetic rim 137 prevents the low frequency AC fields that are produced as the rotor is brought up to synchronous speed from reaching the superconductive winding 115. This is achieved by providing a magnetic flux shunt path between poles that has a much smaller magnetic reluctance than does the magnetic flux path through core 113, that includes two traverses of vacuum chamber 121 of dewar vessel 119. If these AC fields were not prevented from reaching the superconductor, eddy current and hysteresis losses that reach excessive levels would be produced. As the superconductive winding is not energized until synchronous speed is reached, rim 137 would not be saturated and hence would serve to shunt the low frequency AC fields and prevent them from reaching the superconductive winding. When synchronous speed is reached and the superconductive winding is energized, the shunt path provided by rim 137 would become saturated by a relatively small proportion of the available flux so that the majority of the superconductive field would traverse the main flux path through core 113. Thus, power outputs much greater than those obtainable with a conventional motor of this size would result even after the flux required to saturate rim 137 is subtracted. Therefore, a motor is provided which has the large power output that may be realized by the use of a superconductive winding with a synchronous motor, and yet high starting torque during asynchronous operation may be realized without the excessive losses resulting from eddy currents and the hysteresis effect that would be present if a simple superconducting field winding were utilized.

Figure 7:
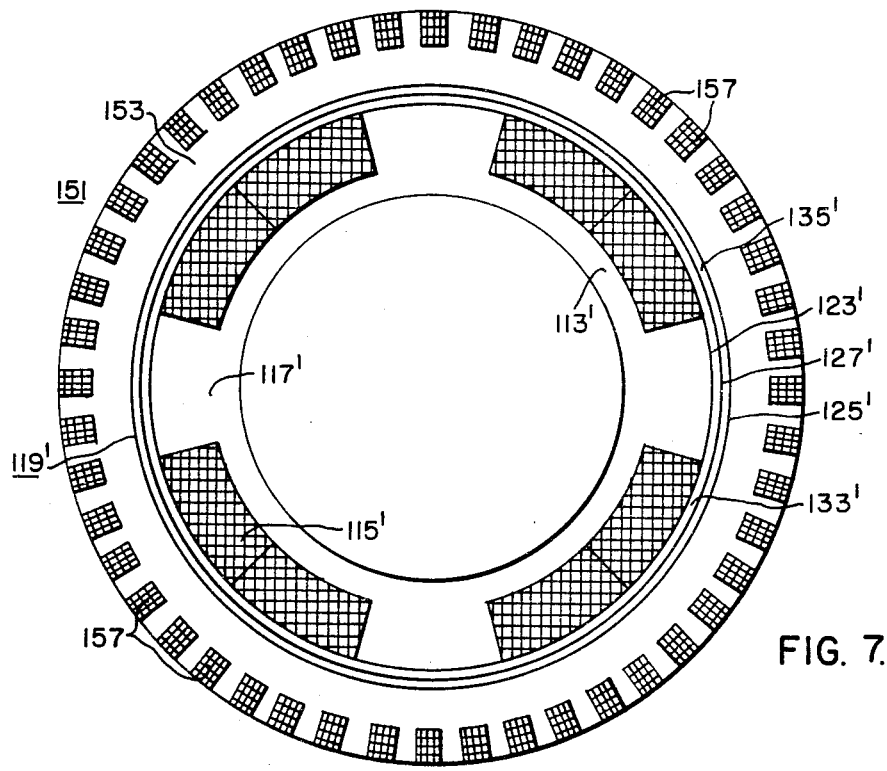
FIG. 7 is a schematic cross-sectional view taken along a plane transverse to the axis of just the rotor of a second AC embodiment of the present invention.

FIG. 7 illustrates a rotor 151 of an alternating current dynamoelectric machine that demonstrates a still further embodiment of the present invention. The stator of this embodiment is identical to that disclosed in FIG. 5 or FIG. 6. Similarly, the internal portion of rotor 151 is identical to that illustrated in FIG. 5 or FIG. 6, and the parts thereof are identified with prime numerals corresponding to the numerals utilized in FIGS. 5 and 6.

In this embodiment, a cylindrical annulus of ferromagnetic material 153 replaces the rim 137 and salient poles 139. Slots 155 are formed in the cylindrical annulus 153. A conventional wound rotor winding 157 is located in the slots 155. However, winding 157 may also be a frog leg winding or other conventional induction winding of the type utilized in induction motors.

The embodiment of FIG. 7 operates in the same fashion as described in connection with the embodiment of FIGS. 5 and 6. Of course, both of these embodiments may be utilized as a synchronous generator (alternator) or synchronous condenser, as well as for the synchronous/asynchronous motor function described.

It should be understood that various modifications, changes and variations may be made in the arrangements, operations and details of construction of the elements disclosed herein without departing from the spirit and scope of the present invention.

We claim:

1. In a dynamoelectric machine having a stator and a rotor, an improved field arrangement comprising:
   a superconductive field winding to produce magnetic flux;
   a salient pole ferromagnetic field structure formed to assist in distributing the magnetic flux produced by said superconductive field winding; and
   insulating means for thermally isolating said superconductive field winding from said salient pole ferromagnetic field structure and ambient conditions.

2. An arrangement as claimed in claim 1 wherein said salient pole ferromagnetic field structure comprises a plurality of main field poles positioned in the air gap between the stator and the rotor of the dynamoelectric machine.

3. An arrangement as claimed in claim 2 wherein each of said main field poles has an auxiliary field winding wound thereon.

4. An arrangement as claimed in claim 1 wherein;
   said insulating means comprises a dewar vessel;
   a radiation shield is located in the vacuum chamber of said dewar vessel; and
   eddy current damper shields formed of conducting material are included in the structure of said dewar vessel.

5. An arrangement as claimed in claim 1 wherein:
   said insulating means comprises a stationary dewar vessel in the form of a generally cylindrical annulus with inner and outer insulating barriers;
   each of said barriers comprises inner and outer generally cylindrical walls forming a vacuum chamber therebetween;
   said superconductive field winding is located in said dewar vessel; and
   said salient pole ferromagnetic field structure comprises a plurality of stationary main field poles positioned between said dewar vessel and the rotor of the machine.

6. An arrangement as claimed in claim 5 and further comprising a plurality of cryogenic magnetic field poles located in said dewar vessel.

7. An arrangement as claimed in claim 6 wherein each of said cryogenic magnetic field poles corresponds to one of said main field poles and is located adjacent thereto.

8. An arrangement as claimed in claim 5 wherein;
each of said main field poles has a neck portion and a head portion;
said head portion is formed with a pole face adjacent the rotor of the machine, said pole face covering a greater circumferential arc than said neck portion; and
an auxiliary winding is wound about said neck portion.

9. An arrangement as claimed in claim 1 wherein:
said salient pole field structure comprises a plurality of stationary main field poles positioned around the rotor of the dynamoelectric machine;
said superconductive field winding comprises a plurality of segments, each segment being wound about an associated one of said main field poles; and
said insulating means comprises a plurality of dewar vessels, each of said dewar vessels enclosing one of said segments of said superconductive field winding.

10. An arrangement as claimed in claim 9 wherein:
each of said main field poles comprises a section of ferromagnetic material protruding from a generally cylindrical annulus of ferromagnetic material, each of said main field poles having an arcuate trapezoidal cross-section with the equal length sides on radial lines extending from the central axis of the dynamoelectric machine; and
each of said segments of said superconductive field winding is wound on the part of the associated main field pole that abuts said annulus of ferromagnetic material.

11. An arrangement as claimed in claim 10 and further comprising an auxiliary field winding wound on the part of each of said main field poles nearer to the rotor of the dynamoelectric machine than the part on which the associated segment of said superconductive field winding is wound.

12. An arrangement as claimed in claim 1 wherein:
said insulating means comprises a dewar vessel in the general shape of a cylinder with inner and outer cylindrical walls having a vacuum chamber therebetween, said dewar vessel being mounted for rotational movement;
said superconductive field winding is located in said dewar vessel; and
said salient pole ferromagnetic field structure comprises a plurality of main field poles positioned about the outer cylindrical wall of said dewar vessel and mounted for rotation with said dewar vessel.

13. An arrangement as claimed in claim 12 and further comprising a cryogenic magnetic core located in said dewar vessel, said superconductive field winding being wound about said core in such a fashion as to produce a plurality of cryogenic magnetic poles, each of said cryogenic magnetic poles corresponding to one of said main field poles and located adjacent thereto.

14. An arrangement as claimed in claim 12 wherein:
each of said main field poles has a neck portion and a head portion; and
said head portion is formed with a pole face adjacent the stator of the machine, said pole face covering a greater circumferential arc than said neck portion.

15. An arrangement as claimed in claim 14 and further comprising an auxiliary winding wound about said neck portion of each of said main field poles.

16. An arrangement as claimed in claim 12 and further comprising a magnetic flux shunt path formed between each pair of adjacent main field poles.

17. A DC dynamoelectric machine comprising:
a housing;
a shaft mounted in said housing;
a smooth rotor mounted on said shaft;
an armature winding wound on said smooth rotor;
a stationary salient pole ferromagnetic field structure surrounding said smooth rotor to aid in distributing magnetic flux in a desired fashion;
a superconductive field winding to produce the magnetic flux which said salient pole ferromagnetic field structure aids in distributing; and
insulating means for thermally isolating said superconductive winding from said salient pole ferromagnetic field structure.

18. A machine as claimed in claim 17 wherein:
said insulating means is a dewar vessel;
a plurality of ferromagnetic cores are located in said dewar vessel;
a separate segment of said superconductive field winding is wound on each of said ferromagnetic cores to form a plurality of cryogenic magnetic poles;
said salient pole ferromagnetic field structure comprises a plurality of main field poles equal in number of said cryogenic magnetic poles and located between said dewar vessel and said smooth rotor; and
an auxiliary field winding is wound on each of said main field poles.

19. A machine as claimed in claim 18 wherein:
interpoles are located between adjacent main field poles;
each of said main field poles and said interpoles has a neck portion and a heat portion;
each of said head portions is formed with a pole face adjacent said smooth rotor;
a compensating winding is wound in said head portion of each of said main field poles;
an auxiliary field winding is wound about said neck portion on each of said main field poles;
a commutating winding is wound about said neck portion of each of said interpoles;
interpolar flux shunts are located between said main field poles; and
eddy current damper shields formed of conductive material are located in the structure of said dewar vessel.

20. A machine as claimed in claim 17 wherein:
said salient pole ferromagnetic field structure comprises a cylindrical annulus of ferromagnetic material surrounding said smooth rotor from which a plurality of main field poles extend toward said smooth rotor;
said superconductive field winding comprises a plurality of segments, each segment being wound about an associated one of said main field poles; and
said insulating means comprises a plurality of dewar vessels, each of said dewar vessels enclosing one of said segments of said superconductive field winding.

21. A machine as claimed in claim 20 wherein:

each of said segments of said superconductive field winding is wound about a first portion of its associated main field pole adjacent to said annulus of ferromagnetic material; and an auxiliary field winding is wound about a second portion of each of said main field poles that is closer to said smooth rotor than is said first portion.

22. A machine as claimed in claim 20 and further comprising:

compensating windings placed in a second portion of each of said main field poles;

interpoles located between each adjacent pair of said main field poles;

interpolar flux shunts located between said main field poles; and eddy current damper shields formed of conductive material and located in the structure of each of said dewar vessels.

23. An AC dynamoelectric machine comprising:
a housing;
a shaft mounted in said housing;
a rotor mounted on said shaft, a first portion of said rotor comprising a superconductive field winding formed on a ferromagnetic core to provide a desired number of cryogenic magnetic poles;
a second portion of said rotor comprising a salient pole ferromagnetic field structure completely surrounding said first portion; and
insulating means for thermally isolating said first portion from said second portion of said rotor.

24. A machine as claimed in claim 23 wherein:
said insulating means comprises a generally cylindrical dewar vessel in which said first portion of said rotor is located;
said salient pole ferromagnetic field structure comprises a plurality of main field poles; and
an auxiliary field winding is wound about each of said main field poles.

25. A machine as claimed in claim 24 and further comprising magnetic flux shunts interconnecting said main field poles.

26. A dynamoelectric machine comprising:
a housing;
a shaft mounted in said housing; p1 a superconductive field winding mounted on said shaft for rotation therewith;
insulating means for thermally isolating said superconductive field winding;
a stator winding mounted in said housing;
a structure of ferromagnetic material arranged to completely separate said superconductive field winding from said stator; and
an auxiliary field winding wound on said structure of ferromagnetic material.

27. A machine as claimed in claim 26 wherein:
said insulating means comprises a generally cylindrical, thermally non-conductive casing that surrounds said superconductive field winding and is mounted for rotation therewith;
a ferromagnetic core is mounted on said shaft and enclosed in said casing, said superconductive winding being wound thereon to establish a plurality of discrete cryogenic poles; and
said structure of ferromagnetic material has a generally cylindrical shape, surrounds said insulating casing and is mounted for rotation with said shaft.

28. A machine as claimed in claim 27 wherein said structure of ferromagnetic material comprises:

a generally cylindrical rim of ferromagnetic material; and a plurality of main field poles extending from said cylindrical rim of ferromagnetic material toward said stator winding, said main field poles equal in number to the number of cryogenic poles.

29. A machine as claimed in claim 28, wherein:
said main field poles have a neck portion adjacent said cylindrical rim and a head portion adjacent said stator winding; and
an auxiliary winding is wound about said neck portion.

30. A machine as claimed in claim 29 wherein:
said insulating casing comprises a vacuum chamber to form a dewar vessel;
a radiation shield is positioned in said vacuum chamber;
eddy current damper shields of electrically conductive material are located in the structure of said vacuum chamber; and
damper starting windings are placed in said head portion of each of said main field poles.

31. A machine as claimed in claim 27 wherein said structure of ferromagnetic material comprises:
a generally cylindrical annulus of ferromagnetic material enclosing said insulating casing; and
an auxiliary winding located in said annulus.

32. A machine as claimed in claim 31 wherein said auxiliary winding is an induction winding.

33. A machine as claimed in claim 31 wherein:
said insulating casing comprises a vacuum chamber to form a dewar vessel;
a radiation shield is positioned in said vacuum chamber; and
eddy current damper shields of electrically conductive material are located in the structure of said vacuum chamber.

34. A DC dynamoelectric machine comprising:
a generally cylindrical housing;
a shaft mounted in said housing;
a smooth cylindrical rotor mounted on said shaft;
an armature winding wound about said smooth rotor;
a salient pole ferromagnetic field structure having a plurality of ferromagnetic main field poles positioned about said smooth rotor, each of said main field poles having an outer neck portion and an inner head portion adjacent said smooth rotor, said head portion having a curved pole face adjacent said armature winding that covers a greater circumferential arc than does said neck portion;
an auxiliary field winding wound about said neck portion of each of said main field poles;
compensating windings located in the head portion of each of said main field poles;
interpoles positioned between said main field poles, each of said interpoles having an outer neck portion and an inner head portion with a pole face of greater circumferential arc than does said neck portion;
commutating windings placed about said neck portion of each of said interpoles;
a stationary dewar vessel in the form of a cylindrical annulus located about said salient pole field structure, said dewar vessel comprising inner and outer insulating barriers, each of said barrier having concentric cylindrical walls forming a vacuum chamber therebetween;

a thermal radiation shield located in each of said vacuum chambers;

a plurality of cryogenic magnetic poles in said dewar vessel, each of said cryogenic magnetic poles positioned adjacent to a corresponding main field pole;

a superconductive field winding placed about said cryogenic magnetic pole to produce magnetic flux;

interpolar iron flux shunts located between said main field poles; and eddy current damper shields formed of conductive material included in the walls of said dewar vessel and in said radiation shield.

35. A DC dynamoelectric machine comprising:

a generally cylindrical housing;

a shaft mounted in said housing;

a smooth cylindrical rotor mounted on said shaft;

an armature winding formed about said smooth rotor;

a salient pole ferromagnetic field structure comprising a cylindrical annulus of ferromagnetic material positioned about said smooth rotor and having a plurality of main field poles extending toward said smooth rotor therefrom, each of said main field poles having an arcuate trapezoidal cross-section with the equal length sides on radial lines extending from the central axis of the dynamoelectric machine, each of said main field poles having a first portion abutting said annulus of ferromagnetic material and bounded by the longer arcuate side and a second portion bounded by the shorter arcuate side and nearer said rotor than said first portion;

a superconductive winding having a plurality of segments, each segment being wound about said first portion of an associated one of said main field poles;

a dewar vessel having a radiation shield in the vacuum chamber thereof enclosing each of said segments of said superconductive winding;

an auxiliary field winding wound about said second portion of each of said main field poles;

compensating windings located in said second portion of each of said main field poles;

interpoles positioned between said main field poles, each of said interpoles having an outer neck portion and an inner head portion with a pole face of greater circumferential arc than said neck portion adjacent said smooth rotor;

commutating windings located about said neck portion of each of said interpoles;

interpolar iron flux shunts located between said main field poles; and eddy current damper shields formed of conductive material included in the walls of said dewar vessel and in said radiation shield.

36. An AC dynamoelectric machine comprising:

a generally cylindrical housing;

a shaft mounted in said housing, said shaft having a reduced diameter portion within said housing;

a ferromagnetic core rotatably mounted on said reduced diameter portion of said shaft;

a superconductive field winding wound on said magnetic core in such a fashion as to produce a plurality of discrete cryogenic magnetic poles;

flanges at either end of said reduced diameter portion of said shaft extending from said shaft a greater distance than the thickness of said ferromagnetic core;

a cylindrical radiation shield having the ends thereof mounted on said flanges to form a first space between said ferromagnetic core with said superconductive field winding wound thereon and said radiation shield;

a generally cylindrical rim of ferromagnetic material positioned about said radiation shield a distance therefrom to form a second space, said first and second spaces having the air pumped therefrom to form a vacuum and hence provide a dewar vessel for said superconductive field winding, said rim being mounted for rotation with said dewar vessel;

a plurality of ferromagnetic main field poles integrally associated with said rim and extending therefrom, said main field poles being equal in number to said cryogenic magnetic poles and having a neck portion abutting said rim and a head portion at the other end thereof;

eddy current damper shields formed of conductive material located on said radiation shield and said rim;

damper starting windings located in said head portion of said main field poles;

an auxiliary winding wound about said neck portion of each of said main field poles;

a generally cylindrical stator core enclosing said rim and said extending main field poles and spaced therefrom; and a stator winding located in said stator core closely adjacent to said extending main field poles.

37. An AC dynamoelectric machine comprising:

a generally cylindrical housing;

a shaft mounted in said housing, said shaft having a reduced diameter portion within said housing;

a ferromagnetic core rotatably mounted on said reduced diameter portion of said shaft;

a superconductive field winding wound on said magnetic core in such a fashion as to produce a plurality of discrete cryogenic magnetic poles;

flanges at either end of said reduced diameter portion of said shaft and extending from said shaft a greater distance than the thickness of said ferromagnetic core;

a cylindrical radiation shield having the ends thereof mounted on said flanges to form a first space between said ferromagnetic core with said superconductive field winding wound thereon and said radiation shield;

a generally cylindrical annulus of ferromagnetic material having slots formed therein and being positioned about said radiation shield a distance therefrom to form a second space, said first and second spaces having the air pumped therefrom to form a vacuum and hence provide a dewar vessel form said superconductive field winding, said annulus being mounted for rotation with said dewar vessel;

eddy current damper shields formed of conductive material located on said radiation shield and said annulus;

an induction winding wound in said slots of said annulus;

a generally cylindrical stator core enclosing said annulus and spaced therefrom; and a stator winding located in said stator core closely adjacent to said annulus and separated therefrom by the air gap of the machine.

38. In an AC rotor adapted for both synchronous and asynchronous operation and having an armature and a field arrangement mounted for relative movement therebetween, an improved field arrangement comprising:
- an induction winding positioned adjacent the armature;
- a plurality of portions of ferromagnetic material;
- a superconductive field winding wound about said portions of ferromagnetic material to form a plurality of magnetic poles;
- insulating means thermally isolating said superconductive field winding from ambient conditions;
- first magnetic flux paths interconnecting adjacent poles during synchronous operation to provide main flux return paths;
- second magnetic flux paths interconnecting adjacent poles during asynchronous operation to shunt AC flux therebetween without penetrating said superconductive winding, said second flux path shunting a relatively small proportion of the magnetic flux between poles during synchronous operation; and
- means for preventing flux flow through said first flux path during asynchronous operation.

* * * * *